United States Patent [19]
Yamamoto et al.

[11] Patent Number: 5,099,273
[45] Date of Patent: Mar. 24, 1992

[54] IMAGE FORMATION DEVICE

[75] Inventors: Yoichi Yamamoto, Nara; Masao Narumiya, Shiki, both of Japan

[73] Assignee: Sharp Kabushiki Kaisha, Osaka, Japan

[21] Appl. No.: 675,296

[22] Filed: Mar. 26, 1991

[30] Foreign Application Priority Data

Mar. 29, 1990 [JP] Japan .................................. 2-84553

[51] Int. Cl.$^5$ .............................................. G03B 27/52
[52] U.S. Cl. ........................................ 355/27; 355/77
[58] Field of Search ................. 355/27, 28, 69, 67, 355/100, 106, 77

[56] References Cited

U.S. PATENT DOCUMENTS 3,796,999 3/1974 Kahn ................................ 350/160 R
4,896,183 1/1990 Ohashi et al. ........................ 355/27

FOREIGN PATENT DOCUMENTS 291300 11/1988 European Pat. Off. .

Primary Examiner—L. T. Hix
Assistant Examiner—D. Rutledge
Attorney, Agent, or Firm—David G. Conlin; Robert M. Asher

[57] ABSTRACT

Image formation device includes an optical image memory which is shaped like a flat board and includes an image area formed almost in the center portion for storing an image and a void area surrounding the image area, where no image is written, the image stored being optically recognizable and able to be repetitively read; image writing means for writing the image in the optical image memory by the selectively irradiating the image area in accordance with data on a desired image; exposing means for exposing a photosensitive material by irradiating light through the optical image memory to the photosensitive material from which color coupler in a non-exposed portion is discharged by applying pressure; light control means for controlling a width of light irradiated to an area of the photosensitive material through the void area in the direction of the widthwise extension of the photosensitive material so that the width of light is identical with the width of the photosensitive material; and developing means for pressing and developing the exposed photosensitive material overlaid with an image receiving medium where the image is to be formed.

2 Claims, 5 Drawing Sheets

IMAGE FORMATION DEVICE

BACKGROUND OF THE INVENTION

1. Field of the Invention

The present invention relates to an image formation device for forming an image after temporarily storing the image in an optical image memory and then reading it.

2. Description of the Prior Art

The U.S. Pat. No. 3,796,999 discloses a display in which laser beam is selectively directed to a liquid crystal cell to display an image on the liquid crystal. The theory of the display is that the heat of the laser beam is utilized to partially change the liquid crystal in phase and an image is formed corresponding to a pattern with which the laser beam is directed. The liquid crystal employed herein is, for example, a smectic liquid crystal.

Japanese Unexamined Patent Publication No. 20773/1989 discloses a device forming an image with the above-mentioned thermal writing type liquid crystal cell. Transmitted or reflected light of the liquid crystal cell is directed to photosensitive material to form a latent image on the photosensitive material, and an image is formed based upon the latent image. Further, a full color image can be also formed by using three liquid crystal cells having primary color R(red), G(green) and B(blue) images written to compose the three images.

In the photosensitive material as previously mentioned, light is irradiated in some part but not in other part to change the state, and thus a latent image is formed. From the part of the photosensitive material which is not irradiated by light, color coupler is discharged upon a pressure development.

When a laten image is formed in the photosensitive material, the photosensitive material is exposed only in areas storing images of the liquid crystal cells. Thus, the photosensitive material has areas unexposed around the exposed areas. The color coupler in the unexposed areas is discharged upon the pressure development to dirty a pressure development unit. To solve it, the unexposed areas are forcibly exposed by a light source other than the light source used for exposure before the pressure development; in this way, however, an extra light source is required; therefore, the device should be larger in size and higher in manufacturing cost.

SUMMARY OF THE INVENTION

The present invention is provided taking the above-mentioned circumstances into consideration; it provides an image formation device which can prevent developing means from being stained because of color coupler unnecessary for an image formation upon a development.

The present invention provides an image formation device comprising an optical image memory which is shaped like a flat board and includes an image area formed almost in the center portion for storing an image and a void area surrounding the image area, where no image is written, the image stored being optically recognizable and able to be repetitively read; image writing means for writing the image in the optical image memory by selectively irradiating the image area in accordance with data on a desired image; exposing means for exposing a photosensitive material by irradiating light through the optical image memory to the photosensitive material from which color coupler in a non-exposed portion is discharged by applying pressure; light control means for controlling a width of light irradiated to an area of the photosensitive material through the void area in the direction of the widthwise extension of the photosensitive material so that the the width of light is identical with the width of the photosensitive material; and developing means for pressing and developing the exposed photosensitive material overlaid with an image receiving medium where the image is to be formed.

The optical image memory may store an image which is recognizable when a light is irradiated and which can be read out any time in the identical state with repetitive irradiations (unless erasing is carried out). For example, it may include that which uses liquid crystal, electro chromic, PLZT (a compound of Pb, La, Zr and Ti), etc. and is identified with an ordinary photosensitive material drum in a copying machine.

Preferably, the optical image memory may be a liquid crystal cell utilizing liquid crystal assuming a smectic C-phase, or nematic-cholesteric mixed liquid crystal. A configuration of the liquid crystal cell may be that which has liquid crystal overlaid with a heat accumulating layer (see U.S. Pat. No. 3,766,999, for example) or that which has an optical writing-type device overlaid with a photoconductive layer (see Japanese Unexamined Patent Publication Nos. 10036/1974 and 10037/1974). The liquid crystal cell may be either a reflection type cell or a transmission type cell. The optical image memory can retain an image once stored for several hours to several tens of days even if it is left as it is.

The image writing means may be that which selectively irradiates light from a laser diode or an LED by scanning or the like in correspondence with desired image data to the image area. For example, it is composed of a laser diode, a mirror for directing a laser light from the laser diode to an optical image memory, a motor having a rotary encoder on an output axis for rotating the mirror, etc.; the motor is controlled in accordance with an output signal from the rotary encoder to scan the laser light.

The exposing means may be a halogen lamp or a discharge tube.

The light control means may be that which controls the area on the photosensitive material irradiated by light through the optical image memory. Thus, the light control means is placed between the exposure means and the optical image memory, or between the optical image memory and the photosensitive material.

The developing means is preferably a pair of pressing rollers pressing the photosensitive material overlaid with the image receiving medium.

In the device thus structured, an image written in the optical image memory by the image writing means and stored in it is exposed by the exposure means to form a latent image corresponding to the image in the photosensitive material. The light irradiating the photosensitive material through the void area in the optical image memory at this time is controlled by the light control means, and then the area on the photosensitive material corresponding to the image area is exposed. In this way, when development is performed by the developing means, there remains no unexposed area around the latent image; thus, it can be prevented that the developing means is stained with the color coupler.

DESCRIPTION OF THE PREFERRED EMBODIMENT

Now, embodiments according to the present invention will be described in detail in conjunction with accompanying drawings; it is not intended that the present invention should be limited to the precise form disclosed herein.

Figure 1:
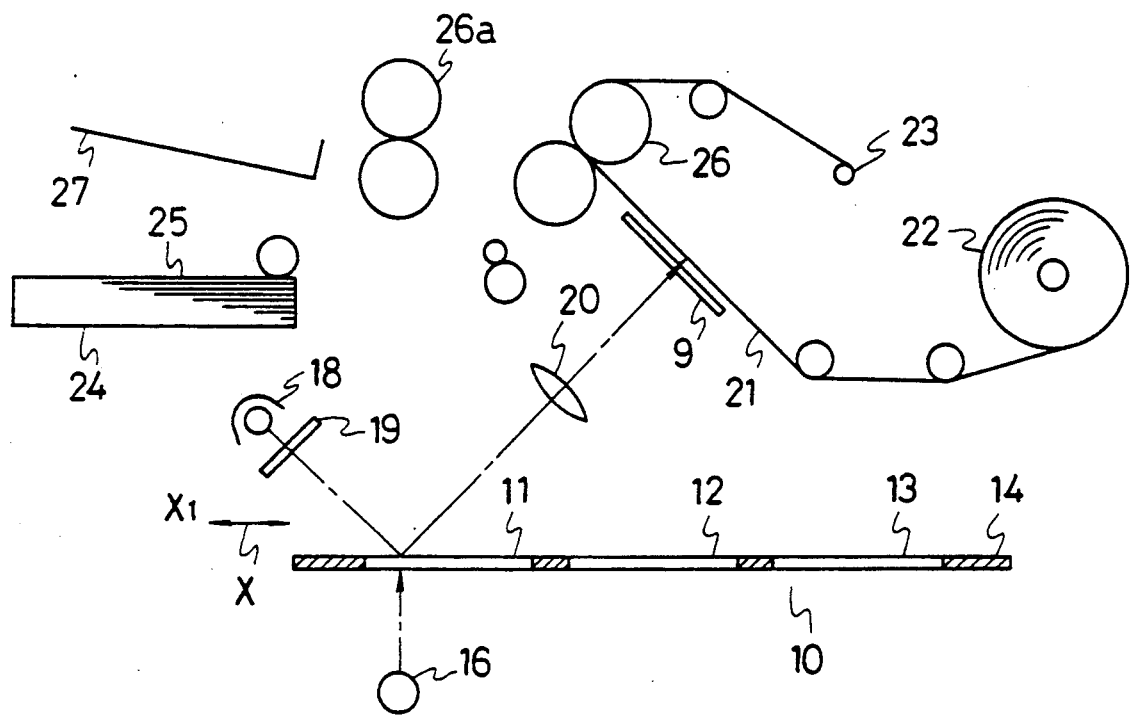
FIG. 1 is a diagram for explaining a structure of an embodiment according to the present invention.

FIG. 1 shows a primary configuration of a full color printer of an embodiment according to the present invention.

Three liquid crystal cells 11, 12 and 13 of which an optical image memory is composed are supported by a frame 14 to make a liquid crystal supporting unit 10.

Figure 2:
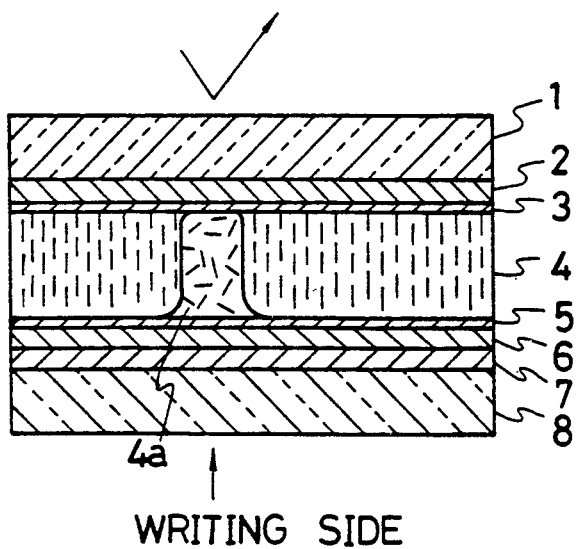
FIG. 2 is a sectional view showing a liquid crystal cell in the embodiment.
Figure 5:
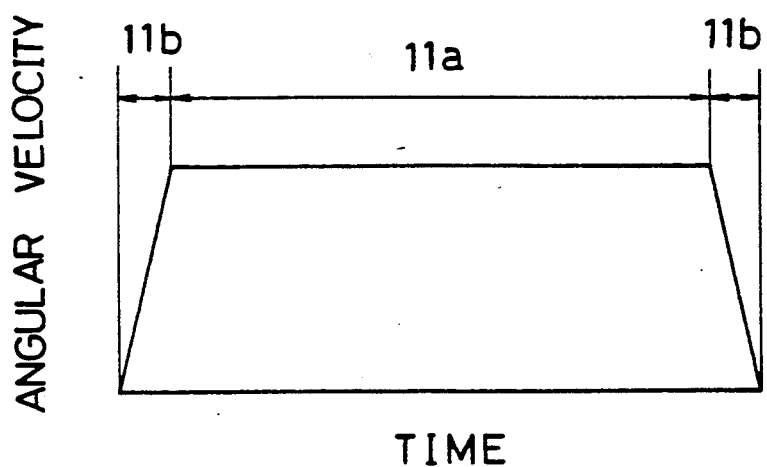
FIG. 5 is a graph showing a rotation velocity of a mirror upon the image writing.

Each of the liquid crystal cells 11, 12 and 13 has, as shown in FIG. 2, a writing side at the bottom of FIG. 2 and a reading side at the top of FIG. 2 and includes glass 1, a transparent electrode 2, a registration layer 3, a liquid crystal layer 4, a registration layer 5, a reflective layer 6 serving as an electrode, a heat absorbing layer 7 and glass 8 overlaid one after another from the top to the bottom. The reflective layer 6 serving as an electrode is, as shown in FIG. 5, covers both an image cell 11a formed almost in the center portion of the cell and a void area 11b surrounding the image area 11a. The void area 11b is formed of a liquid crystal layer, and otherwise it may be formed of a transparent spacer. Specifically, the void area 11b may be formed so that a light transmitted by the liquid crystal layer of transparent spacer is reflected by the reflective layer serving as a electrode 6. As for liquid crystal, a smectic liquid crystal is used which is transparent in the ordinary state. When a laser light is irradiated from the bottom side, or the writing side, of the liquid crystal cell, the heat absorbing layer 7 absorbs it and generates heat; and accordingly, the liquid crystal layer 4 is suffered from a phase change 4a. Because of the phase change, that part becomes cloudy; therefore, when light is irradiated from the uppermost side, the light is absorbed or scattered. On the other hand, in a part which is not cloudy, the light is transmitted by the liquid crystal layer 4 and reflected by the reflective layer 6 serving as an electrode. Thus, there arises a contrast of light between the parts transparent and cloudy, and it is read out as an image. In erasing the image, voltage may be applied between the transparent electrode 2 and the reflective layer 6 serving as an electrode.

Figure 3:
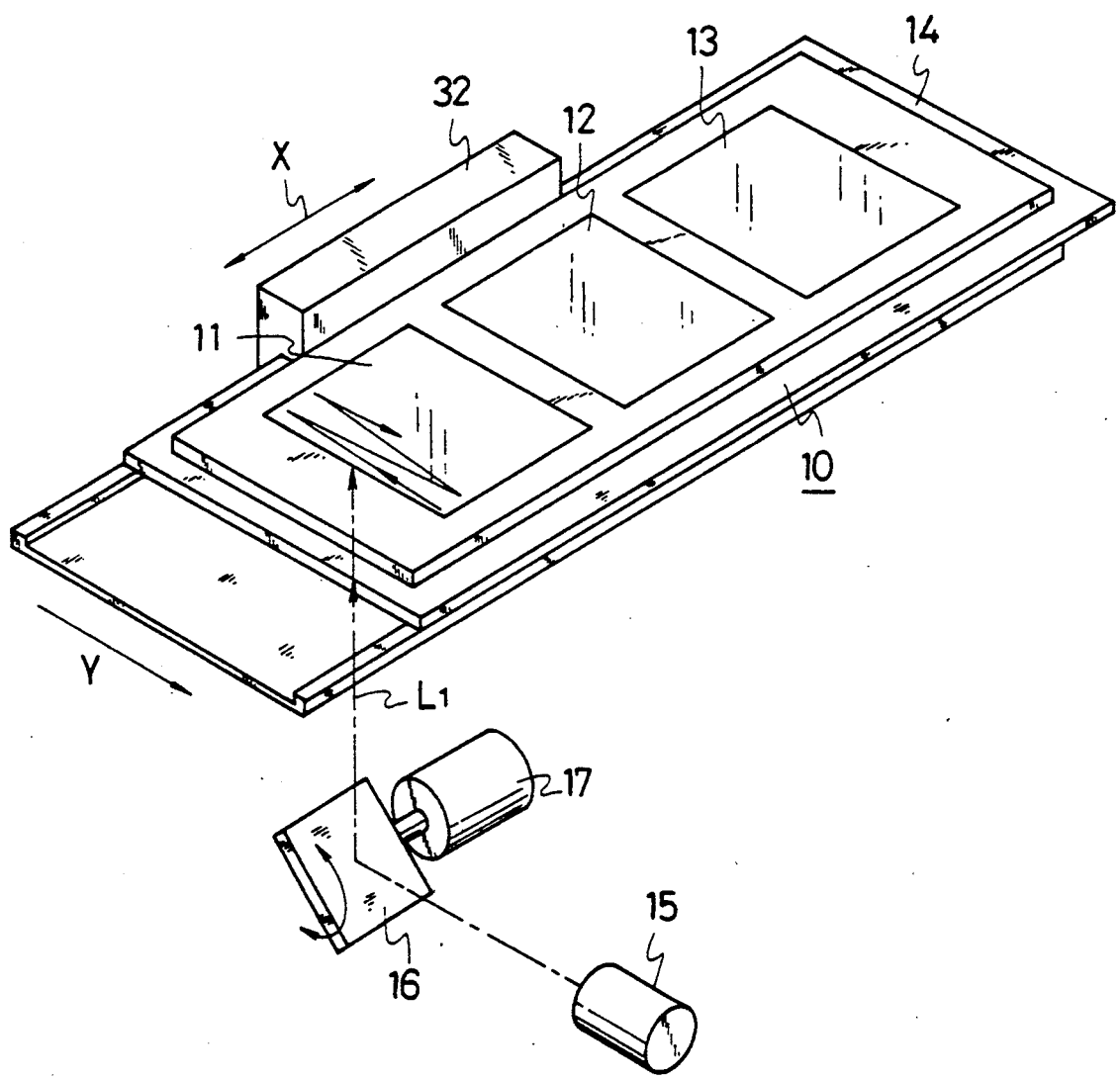
FIG. 3 is a perspective view showing a structure of a major portion of a liquid crystal supporting unit and an image writing device.
Figure 4:
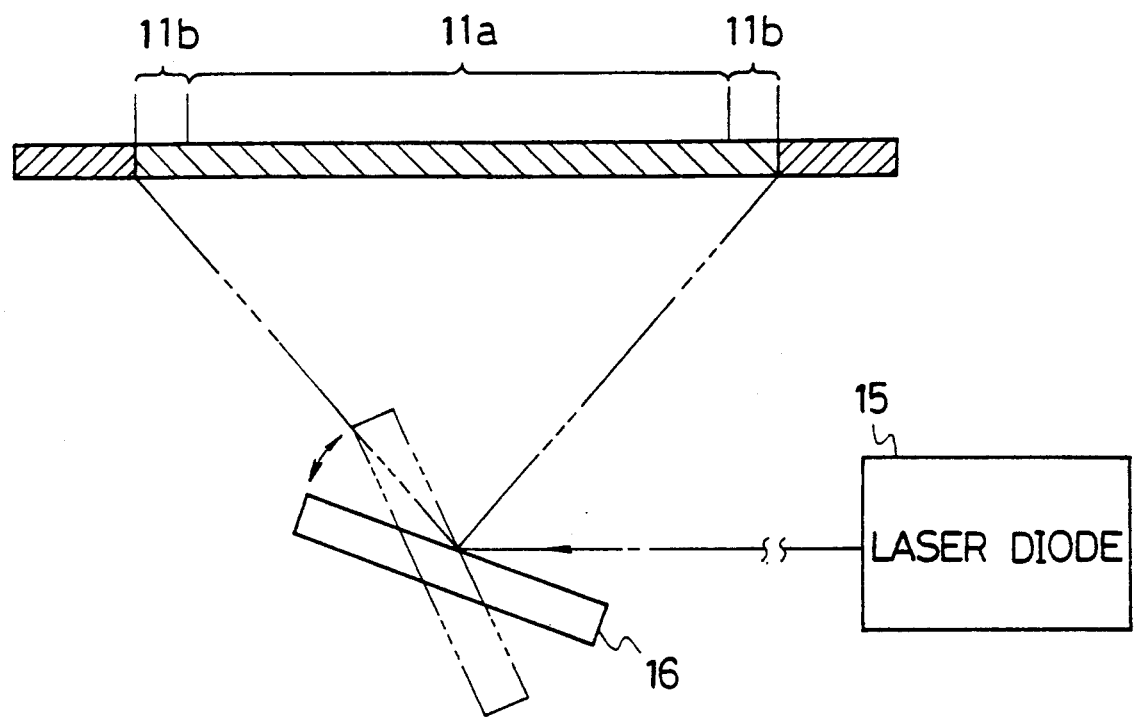
FIG. 4 is a diagram for explaining the operation upon an image writing.

The liquid crystal supporting unit 10 is reciprocally movable in a direction of an arrow X in FIG. 3; the movement is precisely performed by a linear motor 32 (FIG. 3). FIG. 3 shows an appearance of the liquid crystal supporting unit 10. Under the liquid crystal supporting unit 10, an image writing device is placed which includes a laser diode 15, a mirror 16, and a rotary encoder motor 17 (referred to simply as "motor" hereinafter) with a motor connected to a rotary encoder. FIG. 4 shows a cross-section of the liquid crystal cell in FIG. 1 seen from the left; the mirror 16 is reciprocally pivoted by the motor 17 (not shown) between a solid line and a dash-two-dot line. In this way, a laser light from the laser diode 15 performs a spot scanning of the liquid crystal cell 11 and makes an image in the image area 11a in the center position. Around the image area 11a the void area 11b is formed. As shown in FIG. 5, when the mirror 16 is reciprocally pivoted, the speed of the mirror becomes lower at the beginning of the pivotal movement and for a halt (when it makes a U-turn). Then, there is provided the void area 11b around the image area 11a for an approach run and an overrun. In writing an image, when the mirror 16 is reciprocally pivoted moving the liquid crystal supporting unit 10 in an $X_1$-direction of the arrow X, the liquid crystal cell 11 is, referring to FIG. 3, scanned by a laser light in a Y axis direction as shown by an arrow A and an image is written in the liquid crystal cell 11.

Above the liquid crystal supporting unit 10, an exposure device including a light source 18, a color separation filter 19 and a lens 20 is positioned. The light source 18 is a halogen lamp which scans the liquid crystal cells 11 through 13 in their respective plane by moving the liquid crystal supporting unit 10 for each one of the liquid crystal cells in the $X_1$-direction of the arrow X; the light reflected by the liquid crystal cells are guided through an optical mask 9 serving as a light control means to a photosensitive material 21. In the liquid crystal cells 11 through 13, images corresponding to image data of R(red), G(green) and B(blue) are written in advance. The color separating filter 19 selectively transmits a light of a specified color; for example, it includes three filters, a filter transmitting a red wavelength, a filter transmitting a green wavelength and a filter transmitting a blue wavelength. The color separation filter 19 is switched among the filter transmitting the red wavelength in reading the liquid crystal cell where an R image is written, the filter transmitting the green wavelength in reading the liquid crystal cell where a G image is written, and the filter transmitting the blue wavelength in reading the liquid crystal cell where a B image is written.

The photosensitive material 21 may be a full color type photosensitive and pressure sensitive sheet disclosed in Japanese Unexamined Patent Publication No. 30537/1984, which is coated with three kinds of micro capsules uniformly dispersed; (1) micro capsules loaded with a photo-hardening material sensitive to a red light and dye developing cyanogen, (2) micro capsules loaded with a photo-hardening material sensitive to a green light and dye developing magenta and (3) micro capsules loaded with a photo-hardening material sensitive to a blue light and dye developing yellow. The photosensitive and pressure sensitive sheet makes a roll wound around a supply axis 22 and is sent from the supply axis 22 to a take-up axis 23 when an image is formed. While being sent, the sheet is exposed to specific color lights through the color separation filter 19 and the liquid crystal cells 11 through 13. The reflected lights of the R, G and B images of the liquid crystal cells are projected overlapped with a corresponding part of the photosensitive material 21. Thus, on the photosensitive material 21, the above-mentioned micro capsules (1)–(3) are hardened on the same plane; consequently, a full color latent image is formed. To the latent image, a image receiving sheet 25 held in a sheet cassette 24 is supplied; both the sheets are pressed by a pressing roller 26, overlaid with each other. In general, the image receiving sheet 25 is coated with developer for making the dye loaded in the micro capsules develop color (e.g., Japanese Unexamined Patent Publication No. 88739/1983). The developer maybe laid on the surface of the photosensitive material 21. The micro capsules which were not exposed to light (which correspond to a cloudy area in the liquid crystal) are crashed, and the dye is discharged and makes a reaction with the developer of the image receiving sheet 25; thus, an image is formed on the image receiving sheet. In this way, a printing is performed. The image receiving sheet 25 having the image formed (developed) is subjected to a heat treatment with a heating roller 26a; thereafter, it is discharged into a paper tray 27.

Assuming now that the width of the photosensitive material 21 is 230 mm and the images stored in the liquid crystal cells 11, 12 and 14 are enlarged 8.5 times as much and projected onto the photosensitive material 21, an image of A4 size can be projected onto the photosensitive material 21 with 20 mm in a distance between the images formed in the photosensitive material 21. In this case, the liquid crystal cells 11, 12 and 13 have the image area 11a of the following size:

$$230/8.5 \times (296+20)/8.5 = 27.1 \times 37.2 \text{ (mm)}$$

Figure 6:
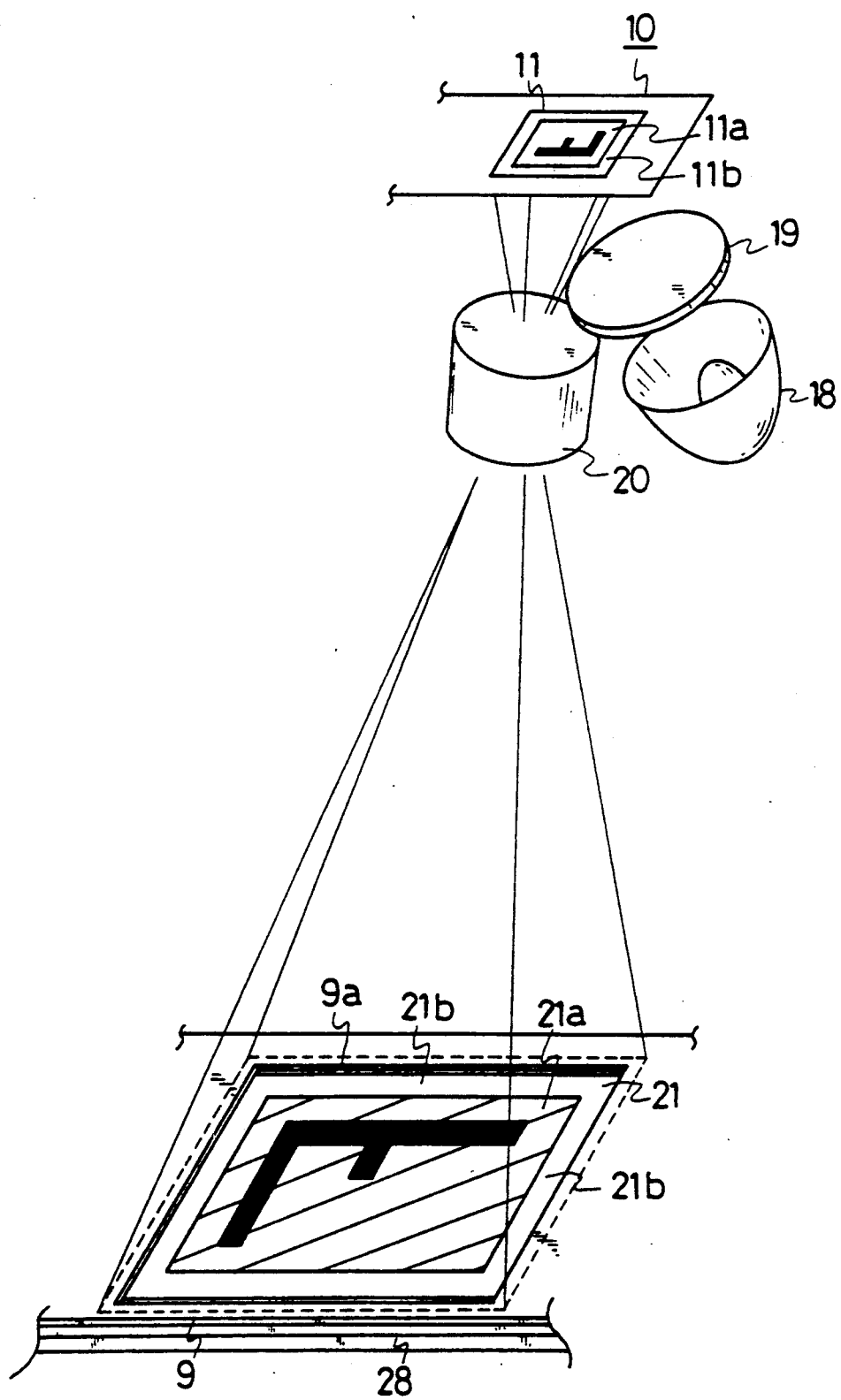
FIGS. 6 and 7 are a perspective view and a sectional side view showing a major portion, presented for explaining the operation of an optical mask upon an exposure.
Figure 7:
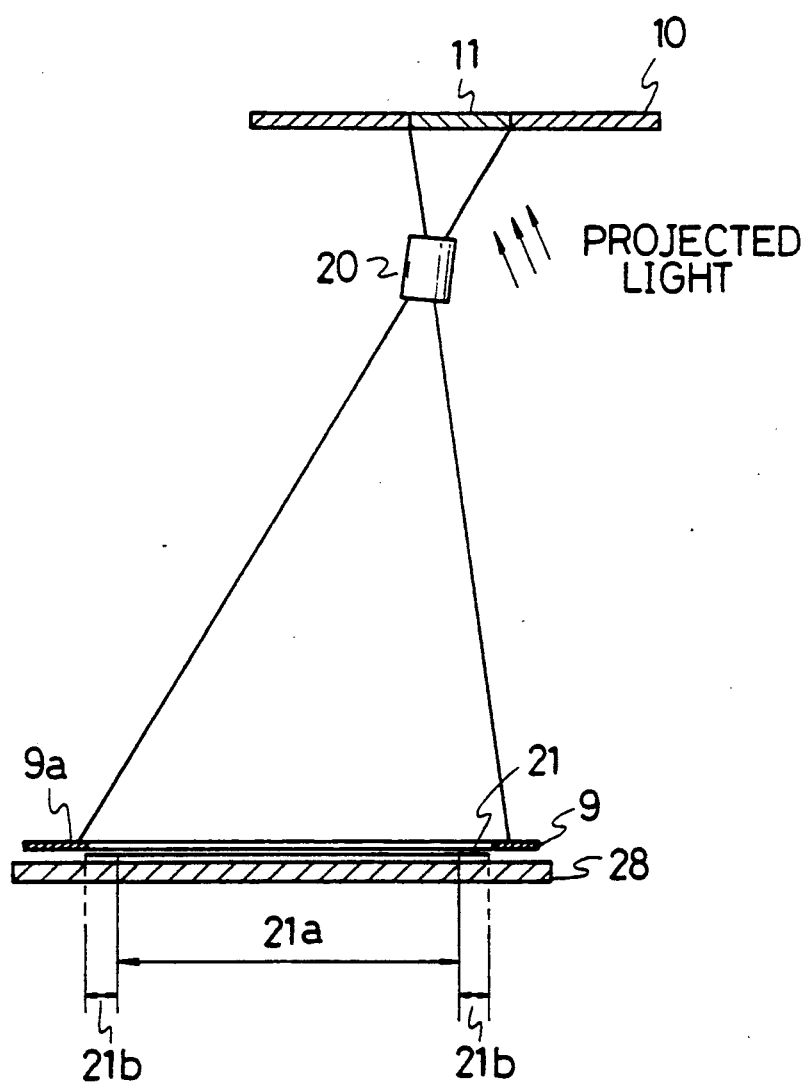

The light reflected by the liquid crystal cell 11 upon the exposure is, as shown in FIGS. 6 and 7, irradiated through an opening 9a of the optical mask 9 to an area larger than the width of the photosensitive material 21 on an exposure stand 28. In other words, the reflected light is irradiated to an image area 21a of the photosensitive material 21 corresponding to the image area 11a of the liquid crystal cell 11, while it is irradiated to an area 21b surrounding the image area 21a of the photosensitive material 21 corresponding to the void area 11b of the liquid crystal cell 11. In this way, as the area 21b is exposed to the three-color (R, G and B) lights reflected by the void area 11b, all the micro capsules (1)–(3) are hardened.

The opening 9a of the optical mask 9 has an inner size in the widthwise direction of the photosensitive material 21 somewhat larger than the width of the photosensitive material 21. The optical mask 9 also functions to prevent the light having no part in the exposure from being a stray light to which the undesirable part of the photosensitive material 21 is exposed.

The optical mask 9 may be placed in a position where the light of the light source 18 irradiated to the liquid crystal cell can be controlled so that the light irradiates the overall region of the void area of the liquid crystal cell, or in an optical path between the light source 18 and the liquid crystal cell.

In the above-mentioned embodiment, a reflection type liquid crystal cell has been explained, a transmission type liquid crystal cell may be used.

According to the present invention, upon an exposure of photosensitive material, an area around an image area of the photosensitive material is exposed through a void area of an optical image memory; hence, upon a development, it can be prevented that unnecessary color coupler of the photosensitive material makes a developing means dirty. By virtue of the exposure in this manner, there is no need of providing another light source; therefore, the device can be smaller in size and lower in cost.

What is claimed is:
1. Image formation device comprising:
   an optical image memory for storing an image which is optically recognizable and able to be repetitively read;
   image writing means for writing the image in an image area almost in the center of the optical image memory by a beam of light and forming a void area surrounding the image area;
   a roll of photosensitive material from which color coupler in an on-exposed portion is discharged by applying pressure, said photosensitive material having two opposed edges;
   exposing means for exposing the photosensitive material by irradiating light through the image and void areas to the photosensitive material, the light irradiated through the void area covering both opposed edges of the photosensitive material; and
   developing means for pressing and developing the exposed photosensitive material overlaid with an image receiving medium where the image is to be formed.
2. A device according to claim 1, wherein the optical image memory is composed of liquid crystal cells.

* * * * *